(12) United States Patent
Hayashida et al.

(10) Patent No.: US 7,226,651 B2
(45) Date of Patent: Jun. 5, 2007

(54) ARTICLE WITH COMPOSITE HARDCOAT LAYER AND METHOD FOR FORMING COMPOSITE HARDCOAT LAYER

(75) Inventors: Naoki Hayashida, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 89 days.

(21) Appl. No.: 10/507,216

(22) PCT Filed: Mar. 24, 2003

(86) PCT No.: PCT/JP03/03560

§ 371 (c)(1),
(2), (4) Date: Sep. 16, 2004

(87) PCT Pub. No.: WO03/081296

PCT Pub. Date: Oct. 2, 2003

(65) Prior Publication Data

US 2005/0112365 A1    May 26, 2005

(30) Foreign Application Priority Data

Mar. 26, 2002    (JP) .............................. 2002-086721

(51) Int. Cl.
*B32B 7/02*    (2006.01)
*B32B 9/04*    (2006.01)

(52) U.S. Cl. ..................... 428/64.4; 369/283; 427/387; 427/515; 428/446; 428/447; 428/412; 428/523; 428/448

(58) Field of Classification Search ..................... None
See application file for complete search history.

(56) References Cited

U.S. PATENT DOCUMENTS

| 5,425,988 | A | * | 6/1995 | Ogawa et al. | ............... 428/333 |
| 5,571,569 | A |   | 11/1996 | Kato et al. | |
| 5,783,260 | A | * | 7/1998 | Kato et al. | ................... 427/493 |
| 6,465,108 | B1 | * | 10/2002 | Kamitani et al. | ........... 428/448 |
| 6,551,703 | B1 | * | 4/2003 | Falcone et al. | ............. 428/336 |
| 6,576,320 | B2 | * | 6/2003 | Hayashida et al. | ........ 428/64.1 |
| 6,582,823 | B1 | * | 6/2003 | Sakhrani et al. | ............ 428/412 |
| 6,649,273 | B2 | * | 11/2003 | Iwato et al. | ................ 428/448 |
| 2002/0015851 | A1 |   | 2/2002 | Higuchi et al. | |
| 2003/0211276 | A1 | * | 11/2003 | Hayashida et al. | ........ 428/64.4 |
| 2004/0021966 | A1 | * | 2/2004 | Takahashi et al. | .......... 359/883 |
| 2004/0253369 | A1 | * | 12/2004 | Jallouli et al. | .............. 427/162 |

FOREIGN PATENT DOCUMENTS

| CN | 1336656 A | 2/2002 |
| CN | 1340085 A | 3/2002 |
| JP | 3-2701 | 1/1991 |
| JP | 6-211945 | 8/1994 |
| JP | 7-290639 | * 11/1995 |
| JP | 8-143689 | 6/1996 |
| JP | 8-143690 | 6/1996 |
| JP | 9-39161 | 2/1997 |
| JP | 9-137117 | 5/1997 |
| JP | 9-258003 | 10/1997 |
| JP | 10-26703 | 1/1998 |
| JP | 10-33321 | 2/1998 |
| JP | 11-240098 | 9/1999 |
| JP | 2000-117902 | 4/2000 |
| JP | 2000-191710 | 7/2000 |
| JP | 2000-301053 | 10/2000 |

OTHER PUBLICATIONS

U.S. Appl. No. 10/505,020, filed Aug. 18, 2004, Hayashida et al.
U.S. Appl. No. 10/504,150, filed Aug. 20, 2004, Hayashida et al.

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

The present invention provides inexpensively an article with a hard coat excellent in anti-staining property, lubricity, scratch resistance and abrasion resistance. The present invention also provides a method for forming the hard coat. A hard coat agent composition comprising a curable silicon compound (a hydrolysis-polymerizable silicon compound and/or a condensation compound thereof, or a silazane compound) is applied onto a surface of an article (1) to be hard-coat-treated, thereby forming a hard coat agent composition layer, a surface material layer is formed by film-forming with an anti-staining and/or lubricating functional material that comprises a silicon compound (a silane coupling agent or a silazane compound) on a surface of the hard coat agent composition layer, and the formed hard coat agent composition layer and surface material layer are heated so as to cure the both layers simultaneously, thereby forming a hard coat layer (2) contacting the surface of the article (1) and an anti-staining surface layer (3) contacting the surface of the hard coat layer (2).

31 Claims, 1 Drawing Sheet

ARTICLE WITH COMPOSITE HARDCOAT LAYER AND METHOD FOR FORMING COMPOSITE HARDCOAT LAYER

TECHNICAL FIELD

The present invention relates to an article with a composite hard coat layer, and a method for forming a composite hard coat layer. In the present invention, a composite hard coat layer includes a hard coat layer which is formed on a surface of an article and has scratch resistance and abrasion resistance, and an anti-staining surface layer which is formed on the surface of the hard coat layer and has anti-staining property and lubricity. More specifically, the present invention relates to an article having, on a surface thereof, a composite hard coat layer having anti-staining property, lubricity, scratch resistance and abrasion resistance in the field of various articles for which these properties are required, and a method for forming the composite hard coat layer.

In particular, the present invention concerns a method for forming a composite hard coat layer having anti-staining property, lubricity, scratch resistance and abrasion resistance on a surface of an optical recording medium, a magneto-optical recording medium, an optical lens, an optical filter, an anti-reflection film, or any one of various display elements such as a liquid crystal display, a CRT display, a plasma display and an EL display, without deteriorating these optical property and recording property, and also concerns an article on which this hard coat layer is formed.

BACKGROUND ART

Usually, a protective layer (hard coat layer) is given to the surface of various articles for which scratch resistance and abrasion resistance are required, for example, optical recording media such as a CD (Compact Disk) and a DVD (Digital Versatile Disk), magneto-optical recording media, an optical lens, an optical filter, an anti-reflection film, and various display elements such as a liquid crystal display, a CRT display, a plasma display and an EL display.

In many cases, stains such as a fingerprint, sebum, sweat and cosmetics are adhered to the surface of these articles by user's use of the articles. Once such stains are adheres thereto, they are not easily removed. This is a serious problem, in particular, for optical recording media or optical lenses used to record or reproduce the media since the recording and reproducing of information signals are remarkably obstructed by the adhered stains.

In magneto-optical recording media, a magnetic head runs on an organic protective layer formed on their recording layer. Accordingly, it is required that the abrasion resistance of the protective layer is made high and, simultaneously, the frictional coefficient thereof is made low.

As the method for solving the former problem, suggested are various methods of forming, on the surface of an optical lens or the like, a layer having a nature that stains do not adhere easily to the layer and even if stains adhere to the layer, the stains are easily wiped off, that is, a layer having anti-staining property. Specifically, the following method is adopted in many cases: a method of forming a layer made of a fluorine-based compound or a silicone-based compound on the surface to give water repellency and oil repellency to the surface, thereby improving the anti-staining property.

About the method for overcoming the latter problem, that is, the method for decreasing the frictional coefficient of the surface of a protective layer (hard coat layer), many measures have been suggested so far. Specifically, the following method is used in many cases: a method of forming, on the surface of the protective layer, a film made of a liquid lubricant such as a fluorine-based polymer (for example, perfluoropolyether) or a silicone-based polymer (for example, polydimethylsiloxane), thereby improving lubricity.

Originally, the former anti-staining property and the latter lubricity are entirely different properties. However, it is common to the two that a fluorine-based compound or a silicone-based compound is used as means for giving each of these properties in many cases. Accordingly, problems common to the two are frequently caused when a fluorine-based compound or a silicone-based compound is used to give anti-staining property or lubricity to the surface of a hard coat.

Many fluorine-based compounds or silicone-based compounds are soft. Thus, when these compounds are used, it is very difficult to obtain a sufficient abrasion resistance. In order to overcome such a problem, the following method can be considered: a method of adding an inorganic filler made of $SiO_2$ fine particles or the like to a fluorine-based polymer or silicone-based polymer matrix to make the abrasion resistance high. According to such a method, however, a little improvement is made but a satisfactory abrasion resistance cannot be obtained as far as the fluorine-based polymer or silicone-based polymer is used as the matrix, wherein the inorganic filler is dispersed.

Therefore, the following method is considered: a method of making a protective layer into a lamination structure composed of two or more different layers, making the lower layer into a layer made of a highly hard material, and forming an upper layer made of a fluorine-based compound or silicone-based compound on the surface thereof, thereby giving anti-staining property or lubricity. In this case, it is preferable to make the upper layer, which is made of the fluorine-based compound or silicone-based compound, as thin as possible so as to reflect the hardness of the lower layer in the upper layer, which constitutes the topmost surface of the lamination protective layer. However, in this method, it is very difficult to obtain close adhesion between the lower layer and the upper layer which is made of the fluorine-based compound or silicone-based compound.

As the method for solving the above-mentioned problem about the adhesion, for example, the following method is known: a method of forming a lower layer made of an inorganic material such as $SiO_2$ by such a process as sputtering or sol-gel process; forming, on the surface of the lower layer, an upper layer made of alkoxysilane having fluoroalkyl group by such a process as vapor deposition or solution application; subjecting the resultant to heat treatment in the presence of a very small amount of water content so as to cause dehydration condensation between silanol groups generated by hydrolysis of the alkoxysilane and/or between the silanol groups and hydroxyl groups present in the surface of the lower layer made of $SiO_2$ or the like, whereby the upper layer is fixed onto the lower layer surface through chemical bonds and/or hydrogen bonds.

In this method, it is desired that the lower layer surface has active groups such as hydroxyl groups at a high density. Therefore, the material that can be used in the lower layer is limited to an inorganic compound, in particular, a metal oxide or a metal chalcogenide such as $SiO_2$, $Al_2O_3$, $TiO_2$ or ZnS. Even when the lower layer is made of a metal oxide such as $SiO_2$, in order to make adhesion between this metal oxide and the alkoxysilane of the upper layer sufficient, it is necessary to subject the lower layer surface to activating treatment, such as alkali treatment, plasma treatment or corona discharge treatment, for increasing the density of active groups on the surface before the formation of the upper layer.

An attempt is also made for using a lower layer made of an organic material such as polyethylene, polycarbonate or polymethyl methacrylate; making the surface of the lower layer hydrophilic by such a method as plasma treatment or corona discharge treatment; and forming an upper layer made of the same alkoxysilane as described above on the surface of the lower layer. In this case, however, the adhesion is far poorer than in the case that the above-mentioned inorganic material is used as the lower layer. Thus, a sufficient durability is not obtained.

Japanese Laid-open Patent Publication No. 9-137117 (1997) discloses a method of applying, onto a surface of a resin substrate, a composition comprising a polymerizable compound having in the molecule thereof at least two (meth)acryloyloxy groups and inorganic compound fine particles such as silica fine particles; photo-polymerizing and curing the polymerizable compound by irradiation of active energy rays; subjecting the surface of this cured film to corona treatment or plasma treatment; and then applying, onto the treated surface, a silane compound having in the molecule thereof at least one group which can generate silanol group by hydrolysis, thereby forming a silane compound coat having an improved adhesion to the above-mentioned cured film. In this case, in order to keep the adhesion between the silane compound coat as the upper layer and the cured film as the lower layer, it is likewise necessary to subject the cured film surface to corona treatment or plasma treatment.

In the case that about a protective layer of the above-mentioned magneto-optical recording medium a liquid lubricant such as perfluoropolyether or polydimethylsiloxane is applied onto the surface of an organic protective layer to form a lubricant film, the adhesion between the organic protective layer and the liquid lubricant film may not be considered very much since the lubricant is a viscous liquid. However, there is a possibility in that the lubricant is decreased by sliding a magnetic field modulating head repeatedly for a long term or the lubricant volatilizes little by little in storage of the recording medium over a long term. In this method, therefore, it is desirable that the lubricant is firmly fixed on the organic protective layer surface.

Meanwhile, in order to obtain anti-staining property, it is necessary to give water repellency or oil repellency to the surface of a protective layer, as described above. However, this manner is not necessarily sufficient. The operation of wiping off adhering stains is generally carried out by users. Therefore, in order that users can feel that the operation of wiping off stains is easy at the time of carrying out this operation, it is necessary to decrease the frictional coefficient of the protective layer surface. Relationship between the anti-staining property of an article and the frictional coefficient thereof has hardly been pointed out so far. In reality, however, in order to give anti-staining property, it is essential to make the frictional coefficient low as well as give water repellency and oil repellency.

By making the frictional coefficient of the surface low, an impact caused when a hard projection contacts the surface can be slipped away; therefore, the generation of scratches can be suppressed. Accordingly, from the standpoint of improving the scratch resistance of the hard coat, it is required to make the frictional coefficient of the surface low, as well.

Japanese Laid-open Patent Publication Nos. 6-211945 (1994) and 2000-301053 disclose the formation of a hard coat layer by: applying, onto a substrate, a composition wherein fluoroalkyl acrylate and an acrylic monomer incompatible with this are dissolved at a given ratio in a solvent capable of dissolving the two; and irradiating electron rays onto the composition immediately after the application so as to cure the composition. According to these publications, by the application of the composition into a thickness of 1 to 15 µm and the irradiation of the electron rays immediately after the application, the solvent is instantaneously vaporized. Additionally, the fluoroalkyl acrylate compound and the acrylic monomer are localized so that the composition is cured in the state that the fluoroalkyl acrylate is distributed unevenly in the surface of the coat.

However, according to the two publications, it is necessary to irradiate the electron rays onto the composition so as to cure the composition instantaneously after the application of the composition and before the uneven distribution based on the volatilization of the solvent because the composition containing the components incompatible with each other is used. Accordingly, the timing of irradiating the electron rays after the application is difficult and the method for the application is restricted very much. Coating methods in which the evaporation rate of the solvent is large, for example, spin coating cannot be used.

A most serious problem in the methods disclosed in the publications is that there is a high possibility in that since the solvent is vaporized at the same time when the electron rays are irradiated, the solvent in the cured coat cannot be completely removed. In the publications, it is not at all examined whether the solvent is completely removed from the cured coat or not. In the case that a very small amount of the solvent remains inside, no problem is caused immediately after the formation of the hard coat but there is a possibility in that the coat is cracked or peeled after the use of the article with the coat over a long term. The hardness also becomes insufficient. Thus, a warp of the substrate on which the hard coat is formed is apt to increase gradually.

In the method of vaporizing the solvent at the same time when the electron rays are irradiated, the cured coat is apt to have a porous structure. Thus, the hardness thereof is insufficient and, further, the optical property may deteriorate. Accordingly, even if no problem is caused in the case of applying this method to the production of familiar articles, it is difficult to apply the method to the production of articles for which a very high optical property is required, for example, an optical lens or an optical recording medium.

Japanese Laid-open Patent Publication No. 8-143690 (1996) discloses a method for forming a water-repellent, abrasion-resistant film. The method involves the steps of forming on a resin substrate an uncured foundation layer containing an organic radical polymerization curing composition and a silanol group-containing polysiloxane composition; forming on the uncured foundation layer an uncured upper layer containing a silicone-based polymerization curing composition and a fluorine-containing silane coupling agent; causing the uncured foundation layer to polymerize either by irradiation with light or electron rays or by application of heat not exceeding 120° C.; and causing the uncured upper layer to polymerize by application of heat not exceeding 120° C. In this method, the resulting upper layer has a relatively large thickness of 2 to 3 µm and has a higher hardness than the foundation layer. In this manner, the foundation layer serves as a primer layer and the upper layer serves both as a hard coat layer and an anti-staining, water-repellent layer. Since the upper layer has a large thickness of 2 to 3 μm, it requires considerable amounts of the costly fluorine-containing silane coupling agent.

Silazane compounds have also been used as curing materials. For example, Japanese Laid-open Patent Publication No. 8-143689 (1996) discloses a process in which a polysilazane applied to a substrate is cured by, for example, application of heat.

In a process described in Japanese Laid-open Patent Publication No. 9-39161(1997), a silicone-based resin etc. are applied onto a substrate and are then cured to form an intermediate layer. A polysilazane is then applied onto the intermediate layer and is then cured to form a polysilazane layer. However, the intermediate layer is relatively thin and serves as a primer layer and the polysilazane layer serves as a hard coat. Since the intermediate layer is cured prior to the application and curing of the polysilazane, the adhesion between the both layers is insufficient.

In a process described in Japanese Laid-open Patent Publication No. 11-240098(1999), an active energy ray-curable composition is applied onto a substrate and is then cured to form an abrasion-resistant layer, which is preferably 1 to 50 μm in thickness. Subsequently, a polysilazane is applied onto the abrasion-resistant layer and is then cured to form a polysilazane layer, which is preferably 0.05 to 10 μm in thickness. However, since the abrasion-resistant layer is cured prior to the application and curing of the polysilazane, the adhesion between the both layers is insufficient.

In short, an inexpensive hard coat wherein anti-staining property, lubricity and abrasion resistance are simultaneously realized at high levels has never been known so far.

DISCLOSURE OF THE INVENTION

Objects of the Invention

An object of the present invention is to solve the above-mentioned problems in the related art and provide inexpensively an article with a hard coat excellent in anti-staining property, lubricity, scratch resistance and abrasion resistance. An object of the present invention is also to provide a method for forming a hard coat excellent in anti-staining property, lubricity, scratch resistance and abrasion resistance inexpensively and easily.

SUMMARY OF THE INVENTION

The present inventors made eager investigation. As a result, the present inventors have found out that a hard coat layer having scratch resistance and abrasion resistance is cured/made on a surface of an article, and an anti-staining surface layer having anti-staining property and lubricity is cured/made on the surface of the hard coat layer simultaneously by heating the both layers, thereby forming a composite hard coat layer in which the anti-staining surface layer and the hard coat layer are firmly adhered to each other. Thus, the present invention has been made.

According to the present invention, the followings are provided:

(1) An article with a composite hard coat layer, the composite hard coat layer comprising a hard coat layer on a surface of the article and an anti-staining surface layer on a surface of the hard coat layer, wherein the hard coat layer is made of a cured product of a hard coat agent composition comprising a silicon compound and/or a condensation compound thereof, the anti-staining surface layer is made of a cured product of an anti-staining and/or lubricating functional material that comprises a silicon compound, and the anti-staining surface layer is fixed on the hard coat layer.

The words "is fixed" means that about the water repellency of the composite hard coat layer as described in Examples, for example, the contact angle of water on the hard coat surface is 90 degrees or more at both of the initial time and the time after a cloth is slid on the surface. If the anti-staining surface layer is not fixed, the contact angle of 90 degrees or more cannot be attained, in particular, after the sliding.

(2) The article with the composite hard coat layer according to (1), wherein the anti-staining surface layer has a thickness of 1 nm or more and 100 nm or less.

(3) The article with the composite hard coat layer according to (1) or (2), wherein the hard coat layer is made of a cured product of a hard coat agent composition comprising a hydrolysis-polymerizable silicon compound and/or a condensation compound thereof, the anti-staining surface layer is made of a cured product of an anti-staining and/or lubricating functional material that comprises a silane coupling agent, and the anti-staining surface layer is fixed on the hard coat layer.

(4) The article with the composite hard coat layer according to (1) or (2), wherein the hard coat layer is made of a cured product of a hard coat agent composition comprising a hydrolysis-polymerizable silicon compound and/or a condensation compound thereof, the anti-staining surface layer is made of a cured product of an anti-staining and/or lubricating functional material that comprises a silazane compound, and the anti-staining surface layer is fixed on the hard coat layer.

(5) The article with the composite hard coat layer according to (1) or (2), wherein the hard coat layer is made of a cured product of a hard coat agent composition comprising a silazane compound, the anti-staining surface layer is made of a cured product of an anti-staining and/or lubricating functional material that comprises a silane coupling agent, and the anti-staining surface layer is fixed on the hard coat layer.

(6) The article with the composite hard coat layer according to (1) or (2), wherein the hard coat layer is made of a cured product of a hard coat agent composition comprising a silazane compound, the anti-staining surface layer is made of a cured product of an anti-staining and/or lubricating functional material that comprises a silazane compound, and the anti-staining surface layer is fixed on the hard coat layer.

(7) The article with the composite hard coat layer according to (3) or (4), wherein the hydrolysis-polymerizable silicon compound comprised in the hard coat agent composition is selected from silicon compounds represented by the following general formula (I):

$$Si(X)_{4-n}(R)_n \qquad (I)$$

where X is a hydrolyzable group; R is an organic group; and n is an integer of 0 to 3.

(8) The article with the composite hard coat layer according to (3) or (5), wherein the silane coupling agent comprised in the anti-staining and/or lubricating functional material includes a silicone-based and/or a fluorine-based substituent.

(9) The article with the composite hard coat layer according to (4) or (6), wherein the silazane compound comprised in the anti-staining and/or lubricating functional material includes a silicone-based and/or a fluorine-based substituent.

(10) The article with the composite hard coat layer according to any of (1) to (9), wherein the hard coat agent composition further comprises a polymerization curing organic compound that polymerizes and cures upon irradiation with active energy rays and/or upon application of heat.

(11) A method for forming a composite hard coat layer comprising a hard coat layer and an anti-staining surface layer on a surface of an article, the method comprising the steps of:

applying a hard coat agent composition comprising a silicon compound and/or a condensation compound thereof onto a surface of an article to be hard-coat-treated, thereby forming a hard coat agent composition layer;

film-forming, on a surface of the hard coat agent composition layer, with an anti-staining and/or lubricating functional material that comprises a silicon compound, thereby forming a surface material layer; and heating the formed hard coat agent composition layer and surface material layer so as to cure the both layers simultaneously, thereby forming a hard coat layer contacting the surface of the article and an anti-staining surface layer contacting the surface of the hard coat layer.

(12) The method for forming the composite hard coat layer according to (11), wherein the anti-staining surface layer is formed to have a thickness of 1 nm or more and 100 nm or less.

(13) The method for forming the composite hard coat layer according to (11) or (12), wherein the hard coat agent composition is a hard coat agent composition which comprises a hydrolysis-polymerizable silicon compound and/or a condensation compound thereof, or a hard coat agent composition which comprises a silazane compound.

(14) The method for forming the composite hard coat layer according to any of (11) to (13), wherein the anti-staining and/or lubricating functional material is a material which comprises a silane coupling agent having a silicone-based and/or a fluorine-based substituent, or a material which comprises a silazane compound having a silicone-based and/or a fluorine-based substituent.

(15) The method for forming the composite hard coat layer according to any of (11) to (14), wherein the hard coat agent composition further comprises a polymerization curing organic compound that polymerizes and cures upon irradiation with active energy rays and/or upon application of heat.

(16) The method for forming the composite hard coat layer according to any of (11) to (15), wherein after the hard coat agent composition is applied onto the surface of the article, the hard coat agent composition layer is dried to remove a solvent contained in the hard coat agent composition from the hard coat agent composition layer, and then the surface material layer is formed.

(17) The method for forming the composite hard coat layer according to any of (11) to (16), wherein after the hard coat agent composition is applied onto the surface of the article, the hard coat agent composition layer is dried if necessary, and is then heated, and/or irradiated with active energy rays if the hard coat agent composition comprises the polymerization curing organic compound that polymerizes and cures when irradiated with active energy rays, to turn the hard coat agent composition layer into a half-cured state, and then the surface material layer is formed.

(18) The method for forming the composite hard coat layer according to any of (11) to (17), wherein the surface material layer is formed by film-forming with the anti-staining and/or lubricating functional material by applying or depositing.

If the surface material layer is formed by applying the anti-staining and/or lubricating functional material, then it is dried after the anti-staining and/or lubricating functional material has been applied.

(19) The method for forming the composite hard coat layer according to any of (15) to (18), wherein when the hard coat agent composition comprises the polymerization curing organic compound that polymerizes and cures upon irradiation with active energy rays, either the active energy rays are irradiated after the formed hard coat agent composition layer and surface material layer have been heated, or the active energy rays are irradiated before the formed hard coat agent composition layer and surface material layer are heated.

(20) The method for forming the composite hard coat layer according to (17) or (19), wherein the active energy rays are electron rays or ultraviolet rays.

(21) An article with a composite hard coat layer, the composite hard coat layer comprising a hard coat layer on a surface of the article and an anti-staining surface layer on a surface of the hard coat layer, wherein the article is obtained by applying a hard coat agent composition comprising a silicon compound and/or a condensation compound thereof onto a surface of an article to be hard-coat-treated, thereby forming a hard coat agent composition layer, film-forming, on a surface of the hard coat agent composition layer, with an anti-staining and/or lubricating functional material that comprises a silicon compound, thereby forming a surface material layer, and heating the formed hard coat agent composition layer and surface material layer, so as to cure the both layers simultaneously, thereby forming a hard coat layer contacting the surface of the article and an anti-staining surface layer contacting the surface of the hard coat layer.

(22) The article with the composite hard coat layer according to any of (1) to (10) and (21), wherein the article is an optical recording medium, a magneto-optical recording medium, an optical lens, an optical filter, an anti-reflection film, or any one of various display elements. Examples of the display element include a liquid crystal display, a CRT display, a plasma display and an EL display.

In the description, the wording "a hard coat agent composition layer" means a hard coat layer which has not been cured or has been half-cured (i.e., has been partially cured). The wording "a surface material layer" means a surface layer, namely an anti-staining surface layer, which has not been cured.

MODES FOR CARRYING OUT THE INVENTION

Figure 1:
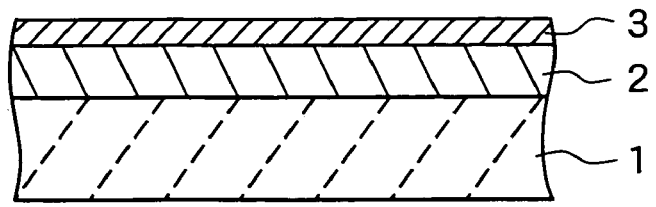
FIG. 1 is a sectional view which schematically illustrates an example of the layer structure of the article with a composite hard coat layer of the present invention.

The following describes the embodiment of the present invention in detail with reference to FIG. 1.

FIG. 1 is a sectional view which schematically illustrates an example of the layer structure of the article with a composite hard coat layer of the present invention. In FIG. 1, a hard coat layer (2) is formed on a surface of an article (1) to be hard-coat-treated, and an anti-staining surface layer (3) is formed to contact the surface of the hard coat layer (2). The combination of the hard coat layer (2) and the anti-staining surface layer (3) is referred to as the composite hard coat layer for the sake of convenience.

Examples of the article (1) include various objects for which hard coat treatment is necessary. Specific examples thereof include sheets or substrates made of a thermoplastic resin such as polyethylene terephthalate (PET), polymethyl methacrylate, polyethylene, polypropylene and polycarbonate. However, the article (1) is not limited to these examples. More specific examples of the article include an optical recording medium, a magneto-optical recording medium, an optical lens, an optical filter, an anti-reflection film, and various display elements such as a liquid crystal display, a CRT display, a plasma display and an EL display.

First, a hard coat agent composition is applied onto the surface of the article (1) to form a hard coat agent composition layer which has not been cured. The hard coat agent composition may comprise a silicon compound and/or a condensation compound thereof. Specifically, the hard coat agent composition may comprise a hydrolysis-polymerizable silicon compound and/or a condensation product thereof or it may comprise a silazane compound. Next, a surface material layer is formed by film-forming with an anti-staining and/or lubricating functional material that comprises a silicon compound on the surface of the hard coat agent composition layer. Specifically, the functional material comprises a silane coupling agent that preferably contains a silicone-based and/or a fluorine-based substituent, or it comprises a silazane compound that preferably contains a fluorine-based substituent.

Alternatively, in the present invention, a primer layer of, for example, ultraviolet ray-curable resin may be formed on the surface of the article (1) prior to the application of the hard coat agent composition, and the hard coat agent composition is subsequently applied onto the primer layer.

The hydrolysis-polymerizable silicon compound for use in the hard coat agent composition is selected from silicon compounds represented by the following general formula (I):

$$Si(X)_{4-n}(R)_n \qquad (I)$$

wherein X is a hydrolyzable group; R is an organic group; and n is an integer of 0 to 3.

The hydrolyzable group denoted by X includes alkoxy groups, halogen groups such as chlorine group, alkenyloxy groups such as isopropenoxy group, acetyloxy groups such as acetoxy group, and amino group. Of these, alkoxy groups are the most common and are thus preferred. Of different alkoxy groups, those having 1 to 4 carbon atoms are preferred, with methoxy group, ethoxy group, and propoxy group being particularly preferred. The organic group denoted by R includes alkyl groups having 1 to 4 carbon atoms or aryl groups, which may have substituents.

Examples of the hydrolysis-polymerizable silicon compound include trimethoxysilane, triethoxysilane, tripropoxysilane, tetramethoxysilane, tetraethoxysilane, tetrapropoxysilane, methyltrimethoxysilane, ethyltrimethoxysilane, propyltrimethoxysilane, methyltriethoxysilane, ethyltriethoxysilane, propyltriethoxysilane, dimethyldimethoxysilane, diethyldiethoxysilane, γ-chloropropyltriethoxysilane, γ-mercaptopropyltrimethoxysilane, γ-mercaptopropyltriethoxysilane, γ-aminopropyltrimethoxysilane, γ-aminopropyltriethoxysilane, phenyltrimethoxysilane, phenyltriethoxysilane, phenyltripropoxysilane, diphenyldimethoxysilane, and diphenyldiethoxysilane. Of these, preferred are tetramethoxysilane, tetraethoxysilane, methyltrimethoxysilane, ethyltrimethoxysilane, methyltriethoxysilane, ethyltriethoxysilane, dimethyldiethoxysilane, phenyltrimethoxysilane, phenyltriethoxysilane, diphenyldimethoxysilane, diphenyldiethoxysilane and the like.

The hydrolysis-polymerizable silicon compounds may be used either alone or in combination of two or more. Condensation compounds formed by partial hydrolysis of the silicon compounds followed by dehydration condensation may also be preferably used. When necessary, trialkylmonoalkoxysilane (n=3) may be added to adjust the physical properties of the product.

The silazane compound for use in the hard coat agent composition may be any silazane compound that includes an Si—N—Si bond. Preferred silazane compounds include cyclic inorganic polysilazanes and chain-like inorganic polysilazanes, which have the structure represented by (—Si(H)$_2$—NH—)$_m$ where m denotes the repetition number of the structural unit, as well as mixtures thereof. Also preferred are polyorganohydrosilazanes in which some or all of the hydrogen atoms bound to the silicon atom in these inorganic polysilazanes have been replaced with organic substituents. These silazane compounds may be used either alone or in combinations or two or more. The silazane compounds are highly reactive during the curing process: while they are generally cured by application of heat, they may also be cured by irradiation with active energy rays when used in conjunction with a photoradical-generating agent. Alternatively, the hard coat agent composition may be a combination of a silazane compound and the above-described hydrolysis-polymerizable silicon compound.

Preferably, the hard coat agent composition may further comprise, aside from the hydrolysis-polymerizable silicon compound and/or the silazane compound (which may be collectively referred to as "curable silicon compounds," hereinafter), a polymerization curing organic compound that polymerizes and thereby cures upon irradiation with active energy rays and/or upon application of heat. Examples of the polymerization curing organic compounds include monomers and oligomers of organic compounds that undergo radical polymerization for curing and monomers and oligomers of organic compounds that undergo cationic polymerization for curing.

The use of the above-described curable silicone compound in the hard coat agent composition in conjunction with the monomer or the oligomer of the polymerization curing organic compound can impart suitable flexibility to the cured hard coat layer while maintaining the abrasion resistance and scratch resistance. It also facilitates formation of thicker hard coat layers, which is difficult when the silicone compound is used alone. Thick hard coat layers help further improve the abrasion resistance and scratch resistance. The use of the monomer or the oligomer of the polymerization curing organic compound along with the silicon compound can significantly improve the adhesion between the hard coat layer and the substrate (in particular, resin substrate). While, if used alone, the hydrolysis-polymerizable silicon compound tends to make conditions for the heat temperature and the amount of time for heating during the curing process difficult, the addition of the monomer or the oligomer of the polymerization curing organic compound, which can undergo polymerization upon irradiation with active energy rays, helps make the curing process mild and rapid. These are the most prominent advantages of the monomers or the oligomers of the polymerization curing organic compounds.

The radical polymerization curing organic compound may be any of those that include, within their molecules, equal to or more than one unsaturated double bond that takes part in radical polymerization, for example, preferred are the compounds having (meth)acryloyl group or vinyl group.

Among such radical polymerization curing compounds, examples of the compound having (meth)acryloyl group include, but are not limited to, trimethylolpropane tri(meth)acrylate, pentaerythritol tetra(meth)acrylate, dipentaerythritol hexa(meth)acrylate, triethyleneglycol di(meth)acrylate, and bis(2-hydroxyethyl)isocyanurate di(meth)acrylate.

Also, examples of the compound having vinyl group include, but are not limited to, divinylbenzene, ethyleneglycol divinylether, diethyleneglycol divinylether, and triethyleneglycol divinylether.

When it is desired to use the radical polymerization curing compound in the hard coat agent composition, it may be used either alone or in combination of two or more compounds. The amount of the radical polymerization curing compound is typically 10 to 2000 parts by weight, preferably 40 to 900 parts by weight, with respect to 100 parts by weight of the curable silicon compound. If the amount is less than 10 parts by weight, then the radical polymerization curing compound hardly exhibits the desired effects. If the amount exceeds 2000 parts by weight, then the curable silicon compound tends to fail to provide the abrasion resistance of the hard coat layer and the adhesion of the surface layer to the hard coat layer tends to be decreased.

In the case that the radical polymerization curing compound is used, the hard coat agent composition preferably contains a known radical photo initiator. Examples of such radical photo initiators include DAROCURE 1173, IRGACURE 651, IRGACURE 184, and IRGACURE 907 (each manufactured by Ciba Specialty Chemicals Inc.). The amount of the radical photo initiator in the hard coat agent composition (as solid component) is for example in the range of from about 0.5 to about 5% by weight.

Also, the cationic polymerization curing organic compound is any compound having at least one reactive group selected from the group consisting of cyclic ether group and vinyl ether group. The structure of this compound is not particularly limited. The cationic polymerization curing compound preferably contains a polyfunctional monomer or oligomer containing, in the single molecule thereof, 2 or more, preferably 3 or more polymerizable groups in order to give a sufficient hardness to a hard coat by irradiation of active energy rays or by heating.

Among such cationic polymerization curing compounds, examples of the compound having cyclic ether group include those having epoxy group, alicyclic epoxy group, or oxetanyl group.

Specific examples of the compound having epoxy group include bisphenol A diglycidylether, novolac-type epoxy resins, trisphenol methane triglycidylether, 1,4-butanediol diglycidylether, 1,6-hexanediol diglycidylether, glycerin triglycidylether, trimethylolpropane triglycidylether, and propylene glycol diglycidylether.

Specific examples of the compound having alicyclic epoxy group include 2,4-epoxycyclohexylmethyl-3,4-epoxycyclohexanecarboxylate, bis(3,4-epoxycyclohexylmethyl)adipate, 2-(3,4-epoxycyclohexyl-5,5-spiro-3,4-epoxy)cyclohexanone-meta-dioxane, bis(2,3-epoxycyclopentyl)ether, and EHPE-3150 (alicyclic epoxy resin, manufactured by DAICEL CHEMICAL INDUSTRIES, LTD.).

Specific examples of the compound having oxetanyl group include 1,4-bis[(3-ethyl-3-oxetanylmethoxy)methyl]benzene, 1,3-bis[(3-ethyl-3-oxetanylmethoxy)methyl]propane, ethyleneglycol bis(3-ethyl-3-oxetanylmethyl)ether, trimethylolpropane tris(3-ethyl-3-oxetanylmethyl)ether, pentaerythritol tetrakis(3-ethyl-3-oxetanylmethyl)ether, dipentaerythritol hexakis(3-ethyl-3-oxetanylmethyl)ether, and ethylene oxide-modified bisphenol A bis(3-ethyl-3-oxetanylmethyl)ether.

Among the cationic polymerization curing compounds, specific examples of the compound having vinyl ether group include triethyleneglycol divinylether, tetraethyleneglycol divinylether, trimethylolpropane trivinylether, cyclohexane-1,4-dimethylol divinylether, 1,4-butanediol divinylether, polyester divinylether, and polyurethane polyvinylether.

When it is desired to use the cationic polymerization curing compound in the hard coat agent composition, it may be used either alone or in combination of two or more compounds. The amount of the cationic polymerization curing compound is typically 10 to 2000 parts by weight, preferably 40 to 900 parts by weight, with respect to 100 parts by weight of the curable silicon compound. If the amount is less than 10 parts by weight, then the cationic polymerization curing compound hardly exhibits the desired effects. If the amount exceeds 2000 parts by weight, then the curable silicon compound tends to fail to provide the abrasion resistance of the hard coat layer and the adhesion of the surface layer to the hard coat layer tends to be decreased.

In the case that the cationic polymerization curing compound is used, the hard coat agent composition preferably contains a known cationic photoinitiator or a known heat-polymerizable cationic curing agent. When the hard coat agent composition contains the cationic photoinitiator, the cationic polymerization curing compound can be cured by irradiation with active energy rays (i.e., cationic photopolymerizability). When the hard coat agent composition contains the heat-polymerizable cationic curing agent, the cationic polymerization curing compound can be cured through the application of heat (i.e., cationic thermal-polymerizability).

Examples of the cationic photoinitiator include onium salts, such as diazonium salts, sulfonium salts, and iodonium salts. Aromatic onium salts are particularly preferred. Also preferred are iron-arene complexes such as ferrocene derivatives, and arylsilanol-aluminum complexes and the like. These cationic photoinitiators are properly selected. Among specific products of the cationic photoinitiators are CYRACURE UVI-6970, CYRACURE UVI-6974, and CYRACURE UVI-6990 (each manufactured by Dow Chemical, USA), IRGACURE 264 (manufactured by Ciba Specialty Chemicals Inc.), and CIT-1682 (manufactured by Nippon Soda). The amount of the cationic photoinitiator in the hard coat agent composition (as solid component) is for example in the range of from about 0.5 to about 5% by weight.

Cationic photoinitiators are agents that generate acids upon irradiation with light. For this reason, the cationic photoinitiators can also act as sol/gel-curing catalysts and can thus be used to carry out the sol/gel process depending on the composition and conditions, eliminating the need for any heating process.

Examples of the heat-polymerizable cationic curing agent include, but are not limited to, thermal latent curing agents, amine-based curing agents, acid anhydride curing agents, polyphenol-based curing agents, and polythiol-based curing agents.

The thermal latent curing agents are easy to handle and are thus the most preferred of the curing agents listed above. Examples of such thermal latent curing agents include organic acid hydrazides and amine imides, which react in an equimolar fashion, and amine salts and sulfonium salts of boron trifluoride, which react catalytically. Commercial products of the heat-polymerizable cationic curing agents, such as SAN-AID SI-60L (manufactured by Sanshin Chemical Industry), are available and are preferably used. The amount of the heat-polymerizable cationic curing agent in the hard coat agent composition (as solid component) is for example in the range of from about 0.5 to about 20% by weight.

If necessary, the hard coat agent composition may contain an inorganic filler in order to improve the abrasion resistance. Examples of the inorganic filler include silica, alumina, zirconia and titania. The average particle size of the inorganic filler is preferably 100 nm or less, more preferably 50 nm or less in the case that transparency is particularly necessary.

If necessary, the hard coat agent composition may further contain a non-polymerizable diluent, an organic filler, a polymerization inhibitor, an antioxidant, an ultraviolet ray absorber, a photo-stabilizer, an antifoamer, a leveling agent, a pigment, a silicon compound and others. Examples of the non-polymerizable diluent include isopropyl alcohol, n-butyl alcohol, methyl ethyl ketone, methyl isobutyl ketone, isopropyl acetate, n-butyl acetate, ethylcellosolve, and toluene.

The silane coupling agent for use in the anti-staining and/or lubricating functional material may be of any structure, provided that it can provide sufficient water-repellency and/or lubricating property. Examples include silane coupling agents that contain a silicone-based substituent and/or a fluorine-based substituent. Specifically, those silane coupling agents may be used that are represented by the general formula (I) for the hydrolysis-polymerizable silicon compound when n=1, 2, or 3 and at least one of the organic groups R is an alkyl group or an aryl group that has a silicone-containing substituent or a fluorine-containing substituent.

Examples of the silane coupling agents that contain a silicone-based substituent may include, but are not limited to, those represented by the following formulae:

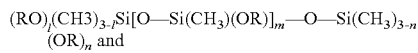

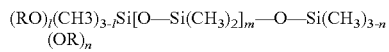

where R is a methyl group or an ethyl group; l and n are each an integer of 0 to 3; and m is an integer of 1 or greater.

Examples of the silane coupling agents that contain a fluorine-based substituent may include, but are not limited to, those represented by the general formula (I) where the organic substituent R is represented by any of the followings:

$CF_3(CF_2)_xCH_2CH_2—$;

$(CF_3)_2CF(CF_2)_xCH_2CH_2—$;

$CF_3[OCF(CF_3)CF_2]_x(OCF_2)_y—$; and $CF_3(OC_2F_4)_x(OCF_2)_y—$ (where x and y are each an integer of 0 to 200.), and X in the general formula (I) is a methoxy group or an ethoxy group. For example, fluorine-containing silane coupling agents disclosed in Japanese Laid-open Patent Publication No. 10-33321(1998) may preferably be used.

The silane coupling agents for use in the anti-staining and/or lubricating functional material may be used either alone or in combination of two or more.

The silazane compounds for use in the anti-staining and/or lubricating functional material may be organosilazane compounds that preferably include a silicone-based substituent or a fluorine-based substituent. The organosilazane compounds are highly reactive during the curing process. The organosilazane compound may be a disilazane compound represented by the following formula:

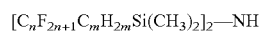

where n is an integer of 4 or greater; and m is 2 or 3. One example of such disilazane compounds is $[C_8F_{17}C_3H_6Si(CH_3)_2]_2$—NH. These disilazane compounds are described in Japanese Laid-open Patent Publication No. 10-26703 (1998).

Aside from the silane coupling agents and the organosilazane compounds, the anti-staining and/or lubricating functional material may further contain small amounts of the polymerization curing organic compounds that polymerize and cure upon irradiation with active energy rays or upon application of heat and are described previously with respect to the hard coat agent composition. When it is desired to use the polymerization curing organic compound, its amount is typically 50 parts by weight or less, preferably 30 parts by weight or less, with respect to 100 parts by weight of the silane coupling agent or the organosilazane compound. If the amount of the polymerization curing organic compound is greater than 50 parts by weight, then the ability of the silane coupling agent or the organosilazane compound to provide a water repellency and/or a lubricating property tends be decreased. If the anti-staining surface layer has an extremely small thickness of 1 nm or more and 100 nm or less, then it may not exhibit sufficient water repellency and/or lubricating property.

As with the hard coat agent composition, the anti-staining and/or lubricating functional material may optionally contain a non-polymerizable diluent, a radical photoinitiator, a cationic photoinitiator, a heat-polymerizable cationic curing agent, an organic filler, an inorganic filler, a polymerization inhibitor, an antioxidant, an ultraviolet ray absorber, a photo-stabilizer, an antifoamer, a leveling agent, a pigment, and a silicon compound and others. The material, however, must be such that it can be used to form a 1 nm or more and 100 nm or less thick ultrathin anti-staining surface layer.

The hard coat agent composition and the anti-staining and/or lubricating functional material in accordance with the present invention can be prepared as described above.

In the present invention, the above-mentioned hard coat agent composition is first applied onto the surface of the article (1) to form a hard coat agent composition layer. The coating method for the application is not limited, and may be any one of various coating methods such as spin coating, dip coating and gravure coating methods.

After the hard coat agent composition is applied onto the surface of the article (1) and before the film is formed with the anti-staining and/or lubricating functional material, it is preferable to remove the fluidity of the hard coat agent composition layer. The removal of the fluidity of the hard coat agent composition layer makes it possible to prevent a variation in the thickness of the hard coat agent composition layer or a deterioration in the surface smoothness thereof when the film is formed with the anti-staining and/or lubricating functional material on the composition layer. In this way, the anti-staining and/or lubricating functional material can easily be made into a uniform film.

To remove the fluidity of the hard coat agent composition layer, for example, it is advisable to dry, after the application of the composition, the applied layer so as to remove the solvent contained in the composition from the hard coat agent composition layer. Also, after the application and optional drying of the applied layer, it is allowable to heat the layer so as to turn the hard coat agent composition layer into a half-cured state. Also, when the hard coat agent composition contains a polymerization curing organic compound that polymerizes and cures upon irradiation with active energy rays, it is allowable to irradiate active energy rays onto the layer so as to turn the hard coat agent composition layer into a half-cured state. Care must be taken in controlling the conditions for heating so that the hard coat agent composition layer does not completely cure. The word "half-cured" means that a part of the applied hard coat agent composition has not yet reacted. Accordingly, the physical hardness of the hard coat agent composition layer is not limited. Thus, the tackiness of the surface is allowed to be lost.

The thickness of the hard coat layer obtained by curing the hard coat agent composition layer is not particularly limited, and may be appropriately decided in accordance with the kind or the use of the article. In the case that the article is, for example, an optical recording disk, it is advisable to set the thickness into 0.1 μm or more and 10 μm or less, preferably 0.2 μm or more and 5 μm or less. If the thickness is less than 0.1 μm, a sufficient surface hardness cannot be given to the disk. If the thickness exceeds 10 μm, the disk tends to be cracked or largely warped.

Next, a surface material layer is formed by film-forming with the above-mentioned anti-staining and/or lubricating functional material on the surface of the hard coat agent composition layer which has not been cured or which has been partially cured (i.e., which is in the half-cured state). It is advisable to form the surface material layer in such a manner that the thickness of an anti-staining surface layer obtained after the surface material layer is cured will be made into 1 nm or more and 100 nm or less, preferably 5 nm or more and 50 nm or less. If the thickness is less than 1 nm, effects of anti-staining property and lubricity are not sufficiently obtained. If the thickness exceeds 100 nm, the hardness of the underlying hard coat layer is not sufficiently reflected. Thus, effects of scratch resistance and abrasion resistance decrease.

The film-forming can be conducted by the application or the deposition of the anti-staining and/or lubricating functional material. The anti-staining and/or lubricating functional material is applied by diluting the anti-staining and/or lubricating functional material with a suitable solvent and then applying the resultant coating solution by any one of various methods such as spin coating, dip coating, gravure coating, and spray coating methods. After the application, the resultant layer is dried.

When the hard coat agent composition comprises the polymerization curing compound that polymerizes and cures upon irradiation with active energy rays and/or upon application of heat, it is preferred to use, as the solvent in this case, a solvent in which the polymerization curing compound in the hard coat agent composition layer which has not been cured or has been partially cured is not substantially dissolved. It depends on not only the kind of the solvent but also the coating method whether or not the hard coat agent composition layer is substantially dissolved. In many cases in which as the coating method of the surface material layer, for example, spin coating is used, almost all of the diluent contained in the coating solution volatilizes when the spin coating is performed. Therefore, even if a solvent in which the hard coat agent composition layer is dissolved to some degree is used as the diluent, no practical problems are caused. In the case that as the coating method of the surface material layer, for example, dip coating is used, the hard coat agent composition layer surface which has not been cured contacts the surface material layer coating solution for a long time. It is therefore necessary to use a solvent in which the hard coat agent composition layer material is not at all dissolved or is hardly dissolved.

Examples of the solvent which can be used in dip coating preferably include saturated hydrocarbons such as n-hexane, cyclohexane, n-octane and isooctane, silicon compounds such as hexamethyldisiloxane, octamethyltrisiloxane and octamethylcyclotetrasiloxane, and fluorocarbons such as perfluorohexane, perfluoroheptane and perfluorooctane. Examples of the solvent which can be used in spin coating include isopropyl alcohol, n-butyl alcohol, dibutyl ether, ethylcellosolve, butylcellosolve, methyl perfluorobutyl ether, ethyl perfluorobutyl ether, HFC 43-10mee, and 1,1,2,2,3,3,4-heptafluorocyclopentane besides the above-mentioned various solvents.

In this way, the hard coat agent composition layer which has not been cured or has been partially cured (i.e., which is in the half-cured state) and the surface material layer which is positioned on the surface thereof and has not been cured are formed.

Next, both the formed hard coat agent composition layer and surface material layer are simultaneously cured by heating. At this time, an amount of heat sufficient to completely cure the both layers is applied to bring the curing reaction of the both layers to completion. While the conditions for heating may not be limited to particular conditions, for example, the heating process is preferably carried out at 60 to 130° C. for about 1 minute to 10 hours. Depending on the material used, it may be effective to carry out the heating process under a high relative humidity of about 60 to 90% to facilitate hydrolysis. As a result, the curable silicon compound (i.e., hydrolysis-polymerizable silicon compound and/or silazane compound) cures in the hard coat agent composition layer and so does the silane coupling agent or the silazane compound in the surface material layer, while the curable silicon compound reacts with the silane coupling agent or the silazane compound in the proximity of the interface of the both layers to firmly adhere the both layers to one another.

When the hard coat agent composition layer contains the radical polymerization curing organic compound or the cationic polymerization curing organic compound that polymerizes and cures upon irradiation with active energy rays, the formed hard coat agent composition layer and surface material layer may be exposed to the active energy rays either following or prior to the heating so that the hard coat agent composition layer is completely cured. Upon this, active energy rays with a sufficient amount of energy to completely cure the hard coat agent composition layer are irradiated. The active energy rays may be properly selected from ultraviolet rays, electron rays, visible rays, and other energy rays.

In the present invention, by curing, at the same time, the hard coat agent composition layer which has not been cured or has been partially cured (i.e., which is in the half-cured state) and the surface material layer which is formed to contact the surface thereof and has not been cured, the both layers are firmly adhered to each other in the interface therebetween. That is, the cured anti-staining surface layer (3) adhered firmly onto the cured hard coat layer (2) is obtained.

By use of such a process of the present invention, it is possible to form, on the high-hardness hard coat layer (2), the anti-staining surface layer (3) which is so thin as to reflect the hardness thereof on the topmost surface and is good in water repellency and lubricity and, further, it is possible to obtain good adhesion between the hard coat layer (2) and the anti-staining surface layer (3). The hardness of the anti-staining surface layer (3) after the curing reaction is lower than that of the hard coat layer (2) after the curing reaction.

By use of such materials and such film-forming and film-curing methods, there is formed a composite hard coat layer which is excellent in abrasion resistance, water repellency and lubricity and is also good in persistence of these properties.

EXAMPLES

The present invention will be described more specifically by way of the following examples. However, the present invention is not limited to these examples.

Example 1

An ultraviolet ray-curable resin (SK5110, manufactured by Sony Chemicals) to serve as a primer layer was applied onto a polycarbonate substrate (thickness: 0.6 mm, diameter: 12 cm) by spin coating. The primer layer was subsequently cured by irradiating with ultraviolet rays. Using a 160 W high-pressure mercury lamp as the light source, ultraviolet rays were irradiated to a total energy of 1.5 J/cm$^2$. The thickness of the resulting primer layer was 2.8 µm.

Subsequently, TS-56H, a heat-curable organosiloxane-based hard coat agent manufactured by Tokuyama Corp., was applied onto the primer layer by spin coating. Thereafter, the resultant was heated at 60° C. in the atmosphere for 1 minute, to remove the diluent in the coat. In this way, a hard coat layer which had not been cured was formed.

A 0.1% solution (% by mass) of DSX (manufactured by Daikin Industries) in Fluorinert FC-77 (manufactured by Sumitomo 3M Ltd.), which served as a silane coupling agent containing a fluorinated hydrocarbon-based substituent, was subsequently applied onto the above-mentioned hard coat layer which had not been cured by spin coating to form a surface layer which had not been cured.

The substrate was then heated in the atmosphere at 95° C. for 2 hours to cure the hard coat layer and the surface layer simultaneously. The thickness of the cured hard coat layer was 0.5 µm, and the thickness of the cured surface layer was about 15 nm. The thickness of the surface layer was measured by X-ray fluorescence analysis (XRF), using a perfluoropolyether (DEMNUM, manufactured by Daikin Industries, Ltd.) as a standard material. In this way, a substrate with a composite hard coat layer was obtained.

Example 2

Beamset HC900, an ultraviolet ray radical-curable/sol-gel heat-curable hybrid hard coat agent manufactured by Arakawa Chemical Industries, Ltd. was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed. This hard coat agent is described in Japanese Laid-Open Patent Publication No. 2000-191710 and is a composition comprising a reaction product of a partial condensate of a tetraalkoxysilane with a hydroxyl group-containing (meth)acrylmonomer/oligomer. The amount of inorganic components present in the nonvolatile components of the hard coat agent was 40% by weight.

A 0.1% solution (% by mass) of DSX (manufactured by Daikin Industries) in Fluorinert FC-77 (manufactured by Sumitomo 3M Ltd.), which served as a silane coupling agent containing a fluorinated hydrocarbon-based substituent, was subsequently applied onto the above-mentioned hard coat layer which had not been cured by spin coating to form a surface layer which had not been cured.

The substrate was then heated at 130° C. for 3 minutes to allow the condensation reaction to take place between partial condensates of tetraalkoxysilane in the hard coat layer and/or between partial condensates of tetraalkoxysilane in the hard coat layer and the above-described fluorinated hydrocarbon-substituted silane coupling agent. Subsequently, ultraviolet rays were irradiated in the atmosphere to cause the polymerization of acryl monomer/oligomer present in the hard coat layer to proceed. Using a 160 W high-pressure mercury lamp as the light source, ultraviolet rays were irradiated to a total energy of 1.5 J/cm$^2$. Subsequently, the resultant was left at 60° C. at 85% RH for 10 hours so that the silane coupling agent was completely reacted. The thickness of the cured hard coat layer was 2.0 µm, and the thickness of the cured surface layer was about 20 nm. In this way, a substrate with a composite hard coat layer was obtained.

Example 3

A substrate with a composite hard coat layer was fabricated in the same manner as in Example 1, except that a 0.1% solution (% by mass) of KP801M (manufactured by Shin-Etsu Chemical Co., Ltd.) in hydrofluoroether (HFE7200, manufactured by Sumitomo 3M Ltd.) was used in place of the solution of the DSX silane coupling agent in Fluorinert FC-77 to serve as the surface layer material. The thickness of the cured hard coat layer was 0.5 µm, and the thickness of the cured surface layer was about 20 nm. KP801M is an organosilazane compound having a fluorinated hydrocarbon-based substituent.

Comparative Example 1

An ultraviolet ray-curable resin (SK5110, manufactured by Sony Chemicals) to serve as a primer layer was applied onto a polycarbonate substrate (thickness: 0.6 mm, diameter: 12 cm) by spin coating. The primer layer was subsequently cured by irradiating with ultraviolet rays. Using a 160 W high-pressure mercury lamp as the light source, ultraviolet rays were irradiated to a total energy of 1.5 J/cm². The thickness of the resulting primer layer was 2.8 µm.

Subsequently, TS-56H, a heat-curable organosiloxane-based hard coat agent manufactured by Tokuyama Corp., was applied onto the primer layer by spin coating to form a hard coat layer which had not been cured. Thereafter, the resultant was precured at 60° C. in the atmosphere for 10 minutes and was then heated at 95° C. for 2 hours to completely cure the hard coat layer.

A 0.1% solution (% by mass) of DSX (manufactured by Daikin Industries) in Fluorinert FC-77 (manufactured by Sumitomo 3M Ltd.), which served as a silane coupling agent containing a fluorinated hydrocarbon-based substituent, was subsequently applied onto the above-mentioned hard coat layer which had been cured by spin coating. The resultant was then left at 60° C. at 85% RH for 10 hours so that the silane coupling agent was sufficiently reacted, forming a cured surface layer. The thickness of the hard coat layer was 0.5 µm, and the thickness of the surface layer was about 15 nm. In this way, a substrate with a composite hard coat layer was obtained.

Comparative Example 2

Beamset HC900, an ultraviolet ray radical-curable/sol-gel heat-curable hybrid hard coat agent manufactured by Arakawa Chemical Industries, Ltd., which used the same material as in Example 2, was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed. The resultant was then heated at 130° C. for 3 minutes to allow the condensation reaction to take place between partial condensates of tetraalkoxysilane in the hard coat layer. Subsequently, ultraviolet rays were irradiated in the atmosphere to cause the polymerization of acryl monomer/oligomer present in the hard coat layer to proceed. Using a 160 W high-pressure mercury lamp as the light source, ultraviolet rays were irradiated to a total energy of 1.5 J/cm². In this way, the hard coat layer which had been cured was formed.

A 0.1% solution (% by mass) of DSX (manufactured by Daikin Industries) in Fluorinert FC-77 (manufactured by Sumitomo 3M Ltd.), which served as a silane coupling agent containing a fluorinated hydrocarbon-based substituent, was subsequently applied onto the above-mentioned hard coat layer which had been cured by spin coating. The resultant was then left at 60° C. at 85% RH for 10 hours so that the silane coupling agent was completely reacted, forming a cured surface layer. The thickness of the hard coat layer was 2.0 µm, and the thickness of the surface layer was about 20 nm. In this way, the substrate with the composite hard coat layer was obtained.

(Evaluation)

About the respective specimens produced in Examples 1 to 3 and Comparative Examples 1 and 2, the following performance tests were made.

(1) Abrasion Resistance

A steel wool #0000 was used, and the wool was reciprocated 20 times so as to be slid onto the hard coat surface of each of the specimens under a load of 4.9N/cm². The degree of injuries generated at this time was judged with the naked eye. The criterion for the judgment was as follows:

○: No injuries were generated;
Δ: Injuries were slightly generated; and
X: Injuries were generated.

(2) Water Repellency and Persistence Thereof

The contact angle of water to the hard coat surface of each specimen was measured. The measurement was made at initial time and after the specimen surface was slid with a cloth impregnated with a solvent respectively. Conditions for the sliding were as follows: a nonwoven cloth (Bemcot Lint-free CT-8, manufactured by Asahi Kasei Co., Ltd.) was impregnated with acetone, and the cloth was reciprocated 50 times to be slid on the specimen surface under a load of 4.9 N/cm². The contact angle was measured at a temperature of 20° C. and a relative humidity of 60%, using a contact angle meter CA-D manufactured by Kyowa Interface Science Co., Ltd.

TABLE 1

|  | Abrasion resistance | Contact angle (degrees) | |
| --- | --- | --- | --- |
|  |  | Initial | After the sliding |
| Example 1 | ○ | 106.3 | 106.7 |
| Example 2 | ○ | 110.8 | 103.0 |
| Example 3 | ○ | 108.5 | 101.5 |
| Comparative Example 1 | ○ | 113.0 | 88.8 |
| Comparative Example 2 | ○ | 112.5 | 83.6 |

The results are shown in Table 1.

As can be seen from Table 1, each of the substrates with the respective hard coat layers of Examples 1 to 3 had a significantly high surface hardness, a high water repellency, and a high persistence thereof. In comparison, the substrate of Comparative Example 1, which used the same material as in Example 1, had lost its water repellency after the sliding with cloth, despite its relatively high initial water repellency. Similarly, the substrate of Comparative Example 2, which used the same material as in Example 2, had lost its water repellency after the sliding with cloth, despite its relatively high initial water repellency. In these Comparative Examples, the adhesion of the surface layer to the hard coat layer was insufficient since the surface layer was formed after the hard coat layer had been cured.

Example 4

This example was a production example of an optical information medium with a composite hard coat layer (abbreviated to the optical disk). In this example, the produced optical disk was of a phase-change type. The present invention can be applied to various disks regardless of the kind of their recording layer. Thus, the present invention can be applied to not only this disk but also a read-only type optical disk, a write-once type optical disk or some other disk.

Figure 2:
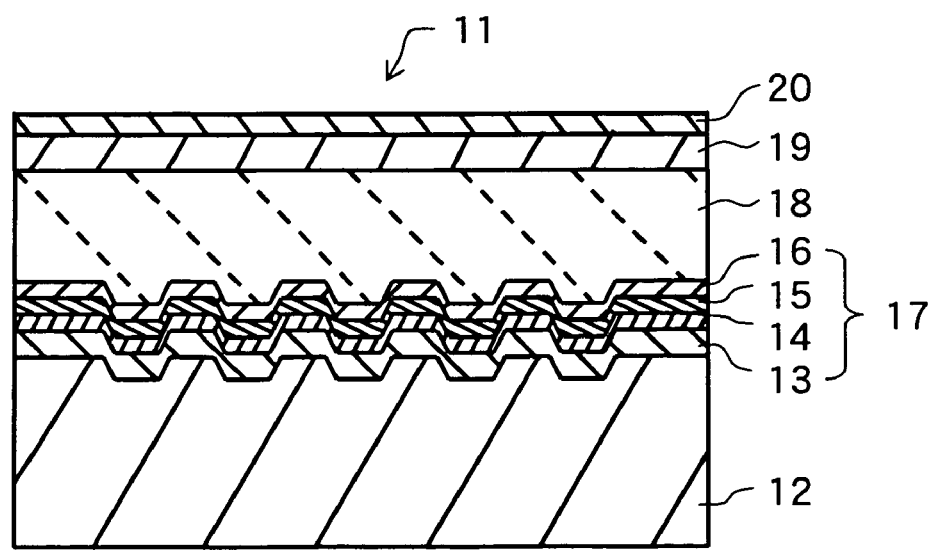
FIG. 2 is a schematic sectional view of an example of the optical disk with a composite hard coat layer of the present invention.

FIG. 2 is a schematic sectional view of an example of an optical disk with a composite hard coat layer. In FIG. 2, an optical disk (11) has, on a surface of a supporting substrate (12) in which fine concavities or convexities (such as information pits or pregrooves) are made, a reflecting layer (13), a second dielectric layer (14), a phase-change recording material layer (15), and a first dielectric layer (16) in this order. The disk (11) has a light-transmitting layer (18) on the first dielectric layer (16), and further has a hard coat layer (19) and an anti-staining surface layer (20) on the light-transmitting layer (18). In this example, the reflecting layer (13), the second dielectric layer (14), the phase-change recording material layer (15) and the first dielectric layer (16) constitute a recording layer (17). The combination of the hard coat layer (19) and the anti-staining surface layer (20) is referred to as the composite hard coat layer for the sake of convenience. The optical disk (11) is used in such a manner that a laser beam for recording or reproducing is introduced into the recording layer through the anti-staining surface layer (20), the hard coat layer (19) and the light-transmitting layer (18).

A sample of the optical disk having the layer structure illustrated in FIG. 2 was produced as follows.

The reflecting layer (13) made of $Al_{98}Pd_1Cu_1$ (atomic ratio) and having a thickness of 100 nm was formed on a surface of the disk-form supporting substrate (12) (made of polycarbonate, diameter: 120 mm, thickness: 1.1 mm), in which grooves for recording information were made, by sputtering. The depth of the grooves was λ/6 in an optical path length at wavelength λ=405 nm. The recording track pitch in a groove recording manner was set into 0.32 μm.

Next, an $Al_2O_3$ target was used to form the second dielectric layer (14) having a thickness of 20 nm on the surface of the reflecting layer (13) by sputtering. An alloy target made of a phase-change material was used to form the recording material layer (15) having a thickness of 12 nm on the surface of the second dielectric layer (14) by sputtering. The composition (atomic ratio) of the recording material layer (15) was set into $Sb_{74}Te_{18}(Ge_7In_1)$. A ZnS (80% by mole)-$SiO_2$ (20% by mole) target was used to form the first dielectric layer (16) having a thickness of 130 nm on the surface of the recording material layer (15) by sputtering.

Next, a radical-polymerizable ultraviolet ray-curable resin having the following composition was applied onto the surface of the first dielectric layer (16) by spin coating, and then ultraviolet rays were irradiated thereon so as to form the light-transmitting layer (18) in such a manner that the thickness thereof would be 98 μm after the layer (18) was cured.

| (Light-transmitting layer: Composition of ultraviolet ray-curable resin) | |
|---|---|
| urethane acrylate oligomer: (DIABEAM UK6035, manufactured by Mitsubishi Rayon Co., Ltd.) | 50 parts by weight |
| isocyanuric acid EO modified triacrylate: (ARONIX M315, manufactured by Toagosei Co., Ltd.) | 10 parts by weight |
| isocyanuric acid EO modified diacrylate: (ARONIX M215, manufactured by Toagosei Co., Ltd.) | 5 parts by weight |
| tetrahydrofurfuryl acrylate: | 25 parts by weight |
| photopolymerization initiator(1-hydroxycyclohexyl phenyl ketone): | 3 parts by weight |

Next, the same heat-curable organosiloxane-based hard coat agent (TS-56H, manufactured by Tokuyama Corp.) as used in Example 1 was applied onto the light-transmitting layer (18) by spin coating, and then the resultant was heated at 60° C. in the atmosphere for 3 minutes to remove the diluent in the coat. In this way, the hard coat layer (19) which had not been cured was formed.

Next, the same silane coupling agent (0.1% solution (% by mass) of DSX manufactured by Daikin Industries in Fluorinert FC-77 (manufactured by Sumitomo 3M Ltd.) as used in Example 1 was applied onto the above-mentioned hard coat layer (19) which had not been cured by spin coating, and then the resultant was heated at 60° C. for 3 minutes. In this way, the surface layer (20) which had not been cured was formed.

The substrate was then heated at 95° C. in the atmosphere for 2 hours to cure the hard coat layer (19) and the surface layer (20) simultaneously. The thickness of the cured hard coat layer was 0.5 μm, and the thickness of the cured surface layer was about 40 nm. In this way, the optical recording disk sample with the composite hard coat layer was obtained.

In the same manner as described above, the optical recording disk sample obtained was evaluated for the abrasion resistance and the contact angle on the side having the composite hard coat layer. For the abrasion resistance, no scratches were formed on the surface of the disk sample, demonstrating that the disk is highly resistant to abrasion. The contact angle was initially 106.3 degrees and 106.7 degrees after the sliding with cloth, indicating that the disk retains high water repellency and persistence thereof.

In the above-mentioned example, the composite hard coat layer was given to the phase-change type optical disks. However, the present invention can be applied to read-only type optical disks or write-once type optical disks as well as optical disks having a phase-change type recording layer. The present invention can also be applied to not only optical information media but also optical lens, optical filters, anti-reflection films, and various display elements. Therefore, the above-mentioned working examples are merely examples in all points, and the present invention should not be restrictedly interpreted by the examples. Furthermore, all modifications belonging to a scope equivalent to that of the claims are within the scope of the present invention.

INDUSTRIAL APPLICABILITY

According to the present invention, an article with a hard coat, which has high abrasion resistance, good water repellency and lubricity, and significantly high persistence thereof, is inexpensively and easily provided.

The invention claimed is:

1. An article comprising a composite hard coat layer which comprises a hard coat layer on the surface of the article and an anti-staining surface layer on the surface of the hard coat layer,
   wherein the hard coat layer comprises a cured product of a hard coat agent composition comprising a hydrolysis-polymerizable silicon compound and/or a condensation compound thereof,
   wherein the anti-staining surface layer comprises a cured product of an anti-staining and/or lubricating functional material that comprises a silazane compound,
   wherein the anti-staining surface layer is fixed on the hard coat layer, and
   wherein the article is an optical recording medium or a magneto-optical recording medium.

2. The article according to claim 1, wherein the silazane compound comprised in the anti-staining and/or lubricating functional material comprises a silicone-based and/or a fluorine-based substituent.

3. The article according to claim 1, wherein the hydrolysis polymerizable silicon compound is selected from silicon compounds respresented by the following general formula (I):

$$Si(X)_{4-n}(R)_n \qquad (I)$$

wherein X is a hydrolyzable group; R is an organic group; and n is an integer of 0 to 3.

4. An article comprising a composite hard coat layer which comprises a hard coat layer on the surface of the article and an anti-staining surface layer on the surface of the hard coat layer, wherein
wherein the hard coat layer comprises a cured product of a hard coat agent composition comprising a silazane compound,
wherein the anti-staining surface layer comprises a cured product of an anti-staining and/or lubricating functional material that comprises a silazane compound,
wherein the anti-staining surface layer is fixed on the hard coat layer, and
wherein the article is an optical recording medium or a magneto-optical recording medium.

5. The article according to claim 4, wherein the silazane compound comprised in the anti-staining andlor lubricating functional material comprises a silicone-based and/or a fluorine based substituent.

6. An article comprising a composite hard coat layer which comprises a hard coat layer on the surface of the article and an anti-staining surface layer on the surface of the hard coat layer,
wherein the hard coat layer comprises a cured product of a hard coat agent composition comprising a silicon compound and/or a condensation compound thereof,
wherein the anti-staining surface layer comprises a cured product of an anti-staining and/or lubricating functional material that comprises a silicon compound,
wherein the anti-staining surface layer is fixed on the hard coat layer, wherein the article is an optical recording medium or a magneto-optical recording medium, and
wherein the hard coat agent composition further comprises a polymerization curing organic compound that polymerizes and cures upon irradiation with active energy rays and/or upon application of heat.

7. A method for forming a composite hard coat layer comprising a hard coat layer and an anti-staining surface layer on a surface of an article, the method comprising:
applying a hard coat agent composition comprising a silicon compound and/or a condensation compound thereof onto a surface of an article to be hard-coat-treated to form a hard coat agent composition layer;
film-forming, on a surface of the hard coat agent composition layer, with an anti-staining and/or lubricating functional material that comprises a silicon compound to form a surface material layer; and
heating the formed hard coat agent composition layer and surface material layer to cure the hard coat agent composition layer and the surface material layer simultaneously to form a hard coat layer contacting the surface of the article and an anti-staining surface layer contacting the surface of the hard coat layer, wherein the article is an optical recording medium or a magneto-optical recording medium.

8. The method according to claim 7, wherein the anti-staining surface layer has a thickness of 1 nm or more and 100 nm or less.

9. The method according to claim 7, wherein the hard coat agent composition comprises a hydrolysis-polymerizable silicon compound and/or a condensation compound thereof, or comprises a silazane compound.

10. The method according to claim 7, wherein the anti-staining and/or lubricating functional material comprises a silane coupling agent having a silicone-based and/or a fluorine-based substituent, or comprises a silazane compound having a silicone-based and/or a fluorine-based substituent.

11. The method according to claim 7, wherein the hard coat agent composition further comprises a polymerization curing organic compound that polymerizes and cures upon irradiation with active energy rays and/or upon application of heat.

12. The method according to claim 7, further comprising drying the hard coat agent composition layer to remove a solvent comprised in the hard coat agent composition from the hard coat agent composition layer, after said applying step and before said film-forming step.

13. The method according to claim 7, further comprising:
optionally drying the hard coat agent composition layer, and then heating the hard coat composition layer and/or irradiating the hard coat agent composition layer with active energy rays to turn the hard coat agent composition layer into a half-cured state after said applying step and before said film-forming step, wherein, the hard coat agent composition comprises the polymerization curing organic compound that polymerizes and cures when irradiated with active energy rays.

14. The method according to claim 7, wherein the film-forming step comprises applying or depositing the anti-staining and/or lubricating functional material.

15. The method according to claim 11, further comprising irradiating with active energy rays after said heating step or
irradiating with active energy rays before said heating step, wherein
the hard coat agent composition comprises the polymerization curing organic compound that polymerizes and cures upon irradiation with active energy rays.

16. The method according to claim 13, wherein the active energy rays are electron rays or ultraviolet rays.

17. The method according to claim 15, wherein the active energy rays are electron rays or ultraviolet rays.

18. An article comprising a composite hard coat layer which comprises a hard coat layer on the surface of the article and an anti-staining surface layer on the surface of the hard coat layer,
wherein the hard coat layer comprises a cured product of a hard coat agent composition comprising a hydrolysis-polymerizable silicon compound and/or a condensation compound thereof,
wherein the anti-staining surface layer comprises a cured product of an anti-staining and/or lubricating functional material that comprises a silazane compound,
wherein the anti-staining surface layer is fixed on the hard coat layer, and
wherein the silazane compound comprised in the anti-staining and/or lubricating functional material comprises a silicone-based and/or a fluorine-based substituent.

19. An article comprising a composite hard coat layer which comprises a hard coat layer on the surface of the article and an anti-staining surface layer on the surface of the hard coat layer,
wherein the hard coat layer comprises a cured product of a hard coat agent composition comprising a silazane compound,
wherein the anti-staining surface layer comprises a cured product of an anti-staining and/or lubricating functional material that comprises a silazane compound,
wherein the anti-staining surface layer is fixed on the hard coat layer, and wherein the silazane compound comprised in the anti-staining and/or lubricating functional material comprises a silicone-based and/or a fluorine-based substituent.

20. An article comprising a composite hard coat layer which comprises a hard coat layer on the surface of the article and an anti-staining surface layer on the surface of the hard coat layer,
   wherein the hard coat layer comprises a cured product of a hard coat agent composition comprising a silicon compound and/or a condensation compound thereof,
   wherein the anti-staining surface layer comprises a cured product of an anti-staining and/or lubricating functional material that comprises at least one substance selected from the group consisting of a silazane compound and a silane coupling agent having a perfluoropolyether group,
   wherein the anti-staining surface layer is fixed on the hard coat layer, and
   wherein the hard coat agent composition further comprises a polymerization curing organic compound that polymerizes and cures upon irradiation with active energy rays and/or upon application of heat.

21. A method for forming a composite hard coat layer comprising a hard coat layer and an anti-staining surface layer on a surface of an article, the method comprising:
   applying a hard coat agent composition comprising a silicon compound and/or a condensation compound thereof onto a surface of an article to be hard-coat-treated to form a hard coat agent composition layer;
   film-forming, on a surface of the hard coat agent composition layer, with an anti-staining and/or lubricating functional material that comprises at least one substance selected from the group consisting of a silazane compound and a silane coupling agent having a perfluoropolyether group, to form a surface material layer; and
   heating the formed coat agent composition layer and surface material layer to cure the hard coat agent composition layer and the surface material layer simultaneously to form a hard coat layer contacting the surface of the article and an anti-staining surface layer contacting the surface of the hard coat layer.

22. The method according to claim 21, wherein the anti-staining surface layer has a thickness of 1 nm or more and 100 nm or less.

23. The method according to claim 21, wherein the hard coat agent composition comprises a hydrolysis-polymerizable silicon compound and/or a condensation compound thereof, or comprises a silazane compound.

24. The method according to claim 21, wherein the silazane compound comprised in the anti-staining and/or lubricating functional material comprises a silicone-based and/or a fluorine-based substituent.

25. The method according to claim 21, wherein the hard coat agent composition further comprises a polymerization curing organic compound that polymerizes and cures upon irradiation with active energy rays and/or upon application of heat.

26. The method according to claim 21, further comprising,
   drying the hard coat agent composition layer to remove a solvent comprised in the hard coat agent composition from the hard coat agent composition layer, after said applying step and before said film-forming step.

27. The method according to claim 21, further comprising:
   optionally drying the hard coat agent composition layer, and then
   heating the hard coat agent composition layer and/or irradiating the hard coat agent composition layer with active energy rays to turn the hard coat agent composition layer into a half-cured state after said applying step and before said film-forming step,
   wherein the hard coat agent composition comprises the polymerization curing organic compound that polymerizes and cures when irradiated with active energy rays.

28. The method according to claim 21, wherein the film-forming step comprises applying or depositing the anti-staining and/or lubricating functional material.

29. The method according to claim 26, further comprising
   irradiating with active energy rays after said heating step or
   irradiating with active energy rays before said heating step, wherein
   the hard coat agent composition comprises the polymerization curing organic compound that polymerizes and cures upon irradiation with active energy rays.

30. The method according to claim 27, wherein the active energy rays are electron rays or ultraviolet rays.

31. The method according to claim 29, wherein the active energy rays are electron rays or ultraviolet rays.

* * * * *